315-158 SR
6/30/87 OR RE 32,450

United States Patent [19]

Blake

[11] E Patent Number: Re. 32,450

[45] Reissued Date of Patent: Jun. 30, 1987

[54] LIGHT-SENSING, LIGHT FIXTURE CONTROL SYSTEM

[76] Inventor: Frederick H. Blake, 3103 Red Cedar La. N., Mill Creek, Wash. 98012

[21] Appl. No.: 916,992

[22] Filed: Oct. 2, 1986

Related U.S. Patent Documents

Reissue of:

[64] Patent No.: 4,587,459
Issued: May 6, 1986
Appl. No.: 565,582
Filed: Dec. 27, 1983

[51] Int. Cl.[4] ..... H05B 37/02

[52] U.S. Cl. ..... 315/158; 315/175; 315/307; 315/320

[58] Field of Search ..... 315/158, 307, 175, 320

[56] References Cited

U.S. PATENT DOCUMENTS

| | | | |
|---|---|---|---|
| 2,882,450 | 4/1959 | McCabe | 315/158 |
| 3,421,005 | 1/1969 | Baker | 315/158 |
| 3,609,451 | 9/1971 | Edgerly | 315/158 |
| 3,670,202 | 6/1972 | Paine et al. | 315/158 |
| 3,710,182 | 1/1973 | VanReenen | 315/209 R |
| 3,801,865 | 4/1974 | Roberts | 315/209 R |
| 3,935,505 | 1/1976 | Spiteri | 315/158 |
| 3,989,980 | 11/1976 | Berman | 315/154 |
| 4,122,334 | 10/1978 | Owens | 250/214 |
| 4,346,331 | 8/1982 | Hoge | 315/158 |
| 4,368,406 | 1/1983 | Kruzich | 315/158 |
| 4,379,254 | 4/1983 | Hurban | 315/307 |

OTHER PUBLICATIONS

Light-O-Matic TM brochures; Novitas, Inc., 1523 26th St., Santa Monica, Calif., 90404.

Lights-Out TM brochures; Novitas, Inc., 1523 27th St., Santa Monica, Calif. 90404.

Enertron, Inc. brochure; Raleigh Industrial Center, 1100 Wicomico St., Baltimore, Md. 21230.

*Primary Examiner*—Harold Dixon
*Attorney, Agent, or Firm*—Bruce A. Kaser

[57] ABSTRACT

Disclosed is a lighting control system which switches a light fixture on or off, depending upon the amount of ambient light. The control system particularly allows natural light from the sun to be used to the greatest extent possible to supplement electric lighting and vice versa. The system incorporates a photocell light sensor, control circuit, power source, and switching unit. The photocell light sensor is mounted in optical communication with a source of ambient light. In response to the detection by the sensor of a predetermined light level, the control circuit activates the switching unit which is interposed in a circuit furnishing electrical power to a light fixture. The power source supplies power to the control circuit at a voltage of no greater than 20 volts at a current of no greater than 8 amps.

10 Claims, 4 Drawing Figures

LIGHT-SENSING, LIGHT FIXTURE CONTROL SYSTEM

Matter enclosed in heavy brackets [ ] appears in the original patent but forms no part of this reissue specification; matter printed in italics indicates the additions made by reissue.

BACKGROUND OF THE INVENTION

This invention relates to a light-sensing, light fixture control system for conserving electrical energy and for providing a more comfortable lighting level. The present invention is useful whenever a varying amount of ambient light, usually from the sun, provides supplemental lighting. This applies to indoor lighting, where windows, skylights, or doors are available, as well as to parking areas or other outdoor lighting situations.

It has been found that electric lights are often misused by their occupants, especially in commercial buildings. People fail to discipline themselves or to remember to turn off the lights when there is adequate or more than enough ambient light. With the high cost of electrical power today and its expected increase in cost in the future, it is increasingly important to utilize natural light from the sun to the greatest extent possible by controlling supplementary electrical lighting.

Various systems have been devised in the prior art to meet these ends. Timer controllers are satisfactory for some outdoor lighting needs, but not for indoor work space lighting as they cannot accommodate differing weather conditions. Further, a timer requires seasonal adjustments to compensate for changes in times of sunrise and sunset. The more sophisticated and complicated energy management systems use a computer clock controller; such systems are expensive to install, particularly in an already existing lighting system. A large number of light fixtures must be operated by a computer system to offset the expense of the computer, other equipment, and installation. Also, such systems do not automatically take into account seasonal or weather changes or changes in the amount of light admitted by window treatments such as venetian blinds and draperies.

The simplest systems typically use a roof-mounted photocell connected to a bi-metal relay, which controls high voltage power to a lighting circuit. Material costs for this type of system are low, which makes it fairly economical even when only a few fixtures need to be controlled. However, the simple systems have several disadvantages. The sensing unit usually has a very limited light sensitivity range of approximately 5 to 30 foot-candles. In the higher light ranges, the simple systems will not perform satisfactorily and usually will not work at all in window light control in the 200 foot-candle range. Adjustments may require trips to the roof with the concomitant time and expense. Because of state and national electrical safety codes, the high-voltage circuitry requires expensive installation methods, i.e. special conduit and a licensed electrician. Additionally, the simple controllers have the capability of sensing only a single level of ambient light intensity. Below this level, the light is turned on; above this level, the light is turned off. Therefore, they cannot be used where the lighting fixture which is being controlled affects the ambient light intensity, because they will cause the light to quickly cycle on and off.

Therefore, it is desirable to have a low-cost system that can be installed in existing buildings without meeting electrical code requirements for high voltage wiring, that can be easily and unobtrusively mounted, and yet provide a reliable, accurate and sensitive control for turning off light fixtures.

It is particularly desirable to include in such a system a high- and low-level, ambient light sensor whereby the lighting level at the actual work place can be monitored and controlled.

It is further desirable that such a system include buffering so that transient changes in light level such as temporary shadows, clouds and reflections will not cause a corresponding transient response in the light fixtures.

It is further desirable that such a system incorporate a "fail-safe" feature that insures that the light fixture circuit will be closed if the system malfunctions or is disconnected.

SUMMARY OF THE INVENTION

The deficiencies in the prior art are overcome by the present invention. One aspect of the system of the present invention essentially includes a photocell light sensor mounted in optical communication with the outside ambient light, a switch interposed in a lighting circuit furnishing electrical power to a light fixture, a control circuit connected to the sensor and to the switch for activating the switch in response to detection of a predetermined light level by the sensor, and a power source for furnishing voltage of no greater than 20 volts at a current of no greater than 8 amperes to the control circuit and hence to the sensor. Because the sensor and control circuit operate on low voltage, i.e. 20 volts or less, and at low power levels, i.e. 8 amperes or less, they qualify for Class 2 wiring under National Electrical Code, #725. This means their wiring may be installed by a layman and may be routed where desired and surface-mounted without conduit. Also, because of the low voltage, low power capability, small, thinly-insulated, unobtrusive wires may be utilized.

The control circuit may operate on 12 volts or less at a current of 150 milliamps or less, whereby even smaller, more unobtrusive wires may be utilized.

According to a further precept of the invention, a single photocell, control circuit, and power source may control multiple switching units for controlling several lighting circuits. This further contributes to simplicity and low cost.

The power source and the switching means may be located immediately adjacent to the light fixture. This facilitates addition of the present invention to already installed lighting systems.

The control circuit may contain a time-delay buffer which prevents transient changes in the ambient light level as determined by the sensor from affecting the output of the control circuit. Thus, temporary shadows, clouds, or bright reflected light will not cause the lighting fixtures to turn on and off rapidly. Yet, this time-delay buffer must not interfere with the ease and rapidity of setting the system to turn on and off at desired light levels.

The control circuit may be adjustable for manually selecting a level of ambient light as detected by the sensor for activating the switching unit.

According to another aspect of the invention, the light sensor is responsive to ambient light from 5 foot-candles (almost complete darkness) to 600 foot-candles (bright sunlight). Thus, it is adaptable both for supplementary natural light type of lighting control in window, door, or skylight areas and for dusk control of nighttime lighting.

According to another aspect of the invention, the switching unit in the light fixture circuit closes the circuit in the absence of any signal from the control circuit. This "fail-safe" feature insures that the light fixture circuit is closed if the control circuit malfunctions or is disconnected, just as if the system were not even installed. Thus, an emergency by-pass switch is not necessary.

In another aspect of the system of the present invention, the light sensor is mounted in optical communication with the ambient light in a work area and thus is affected by the light from the fixture. The control circuit contains a high-level adjustment for manually selecting a level of ambient light as detected by the sensor for activating the switching unit to open the circuit to the lighting fixture, and a low-level adjustment for manually selecting a level of ambient light for activating the switching unit so as to close the circuit to the light fixture. This close-proximity ambient light sensor is necessary where ambient light comes from several sources or where impediments such as blinds, curtains, or shutters can vary the amount of intensity of outside sources of ambient light. In addition to setting desired light levels, the high-low level adjustments prevent the system from getting into a "closed loop", turning on and off, mode.

Other features and many attendant advantages of the invention will become more apparent upon a reading of the following detailed description, together with the drawings, wherein like reference numerals refer to like parts throughout.

DETAILED DESCRIPTION OF THE INVENTION

Figure 1:
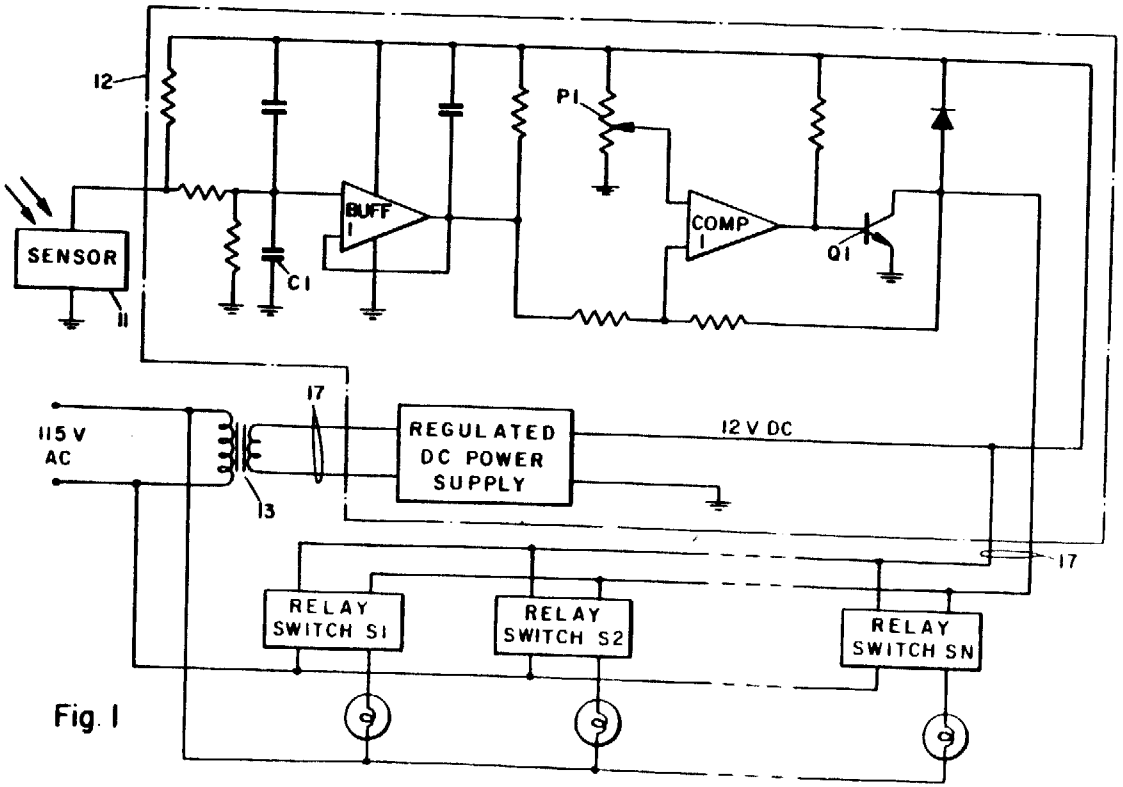
FIG. 1 is a schematic diagram of a preferred embodiment of the light-sensing, light fixture control system of the present invention.

With reference now to the drawings, and more particularly to FIG. 1 thereof, there is shown a schematic diagram of a preferred embodiment of a light-sensing, light fixture control system of the present invention. A light sensor 11, mounted in optical communication with outside ambient light, is electrically connected to a control circuit 12. The resistance of the light sensor 11 varies with the intensity of light detected, thereby varying the voltage at its connection to control circuit 12. The light sensor 11 is responsive to ambient light from 5 foot-candles, almost complete darkness, to 600 foot-candles, bright sunlight. Therefore, it may be used for both supplementary natural light type of light control in window areas or for dusk control of nighttime lighting. The light sensor 11 would commonly be mounted in a window, but could be mounted anywhere a source of ambient light affects the work area, for example on the roof or inside of a skylight or bay door.

The control circuit 12 is electrically connected to the light sensor 11, a power source 13, and a light circuit power switch S1. The control circuit 12 activates the switch S1 in response to detection of a predetermined light level by the sensor 11. The control circuit 12 includes a time-delay buffer C1 for preventing transcient changes in ambient light level as detected by the sensor 11 from effecting the output of the control circuit to the switch S1. Therefore, short variations or interruptions in the source of ambient light, such as temporary shadows, clouds, or bright reflected light, will not cause the lights to blink on and off. The time delay is usually in the order of 10 to 20 seconds depending on the magnitude of the change of light level. Preferably, the time-delay buffer C1 does not interfere with the ease and speed of setting the system with the light level adjustment P1. A voltage buffer BUFF1 outputs a voltage proportional to the voltage produced in response to light detection by the light sensor 11 while isolating the remainder of the control circuit 12 from the current vicissitudes of the light sensing input circuitry. A voltage comparator COMP1 compares the output voltage of the voltage buffer BUFF1 with a user-selected voltage from the light level adjustment P1. If the voltage of the light level adjustment P1 is greater than the output voltage of the voltage buffer BUFF1, then the output of the voltage comparator COMP1 goes high, i.e. approaches 12 volts. When the voltage from the light level adjustment P1 is lower than the voltage from the voltage buffer BUFF1 then the output of the voltage comparator COMP1 goes low, i.e. approaches zero volts. Through use of the light level adjustment P1, the system user determines the light level at which the output of the voltage comparator COMP1 switches from high to low. Amplifier Q1 acts as a switch in the power circuit to the light circuit power switching relay S1. In response to a bright light indication, i.e. a high signal or 12 volts, from the voltage comparator COMP1, the amplifier Q1 activates the light circuit power switching relay S1, thereby opening the circuit to the light fixture. In response to dark detection, i.e. zero volts or a low signal, from the voltage comparator COMP1, the amplifier Q1 turns off thus deactivates the light circuit power switching relay S1 whereby the power circuit to the light fixture is closed.

The Class 2 wires 17 connect the photocell 11 and control circuit 12 with the power supply 13 and switch S1. Because the light sensor 11 and the control circuit 12 operate at a voltage of no greater than 20 volts and an amperage of no greater than 8 amps, the wires 17 qualify for Class 2 wiring under the National Electrical Code #725, whereby they may be installed by a layman and may be routed where desired and surface-mounted without conduit. Also, because of the low voltage, low power capability, small, thinly-insulated, unobtrusive wires may be utilized. Preferably, the control circuit 12 operates on twelve (12) volts or less at a current of 150 millivolts or less whereby even smaller, cheaper, more inconspicuous wires may be utilized.

The power source 13 supplies a voltage of no greater than 20 amperage of no greater than 8 amps to the control circuit 12 via the Class 2 wires 17. The light circuit power relay switch S1, electrically connected to the control circuit 12 by Class 2 wires 17, is interposed in a circuit furnishing electrical power to a light fixture. The switch S1 maintains the lighting circuit closed in the absence of a signal from the control circuit 12. This "fail-safe" feature insures that the lighting circuit is closed if the control circuit malfunctions or is disconnected, just as if the system were not even installed. Thus a by-pass switch is not necessary for emergencies. The control circuit 12 may control a single switch S1 or multiple switches S1, S2, . . . Sn. Each switch S1, S2, . . . Sn may control either a single lamp or an entire lighting circuit. Of course, the switches S1, S2, . . . Sn need not be used solely for a lighting circuit but could be used in conjunction with a radio, T.V., or other appliance.

Another advantage of the low-voltage, low-power requirements of the control circuit 12 is that common telephone type wiring may be used. Such wiring is inexpensive, readily available, and color coded. Also plugs, jacks, and other connectors and mounting devices for this type of wiring are readily available and inexpensive.

Figure 2:
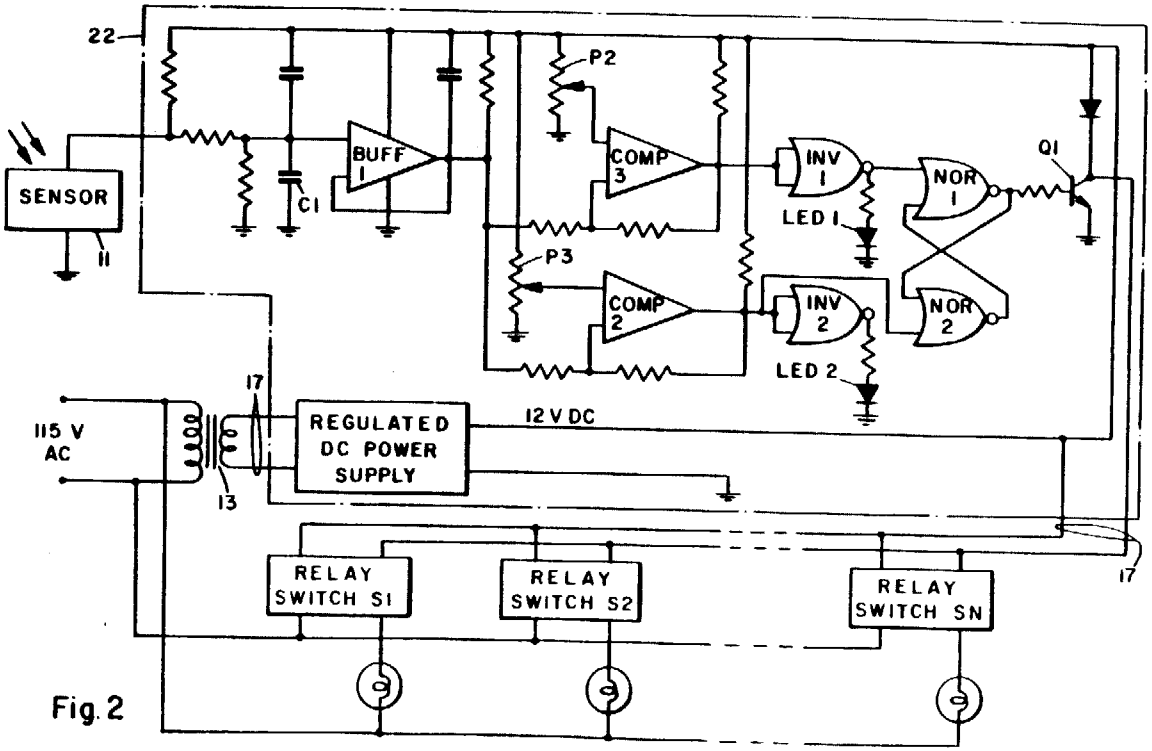
FIG. 2 is a schematic diagram of another preferred embodiment of the light-sensing, light fixture control system of the present invention.

FIG. 2 is a schematic diagram of another preferred embodiment of a light-sensing, light fixture control system of the present invention. The system, generally comprising a light sensor 11, a bi-level control circuit 22, a power source 13, light circuit power switch S1 and Class 2 wiring 17, is essentially the same as the system of FIG. 1 described above except as noted below. The system of FIG. 2, with the bi-level control circuit 22, can directly monitor and control the light level in the work area. The light sensor 11, electrically connected to the bi-level control circuit 22, is mounted in optical communication with the light in the work area. The light sensor 11 would commonly be ceiling mounted, but could be mounted anywhere and it could detect the light level in the work area. In the bi-level control circuit 22, as in control circuit 12, the output of the voltage buffer BUFF1 corresponds inversely to the amount of light detected by the light sensor. However, from this point on, because the bi-level control circuit 22 is used to directly monitor the bi-level in the work area, it must include means for establishing a low-light level below which the light will be turned on and an upper-light level above which the lights will be turned off. To accomplish this two voltage comparators, COMP3 and COMP2, are used, both of which function similarly to the voltage comparator COMP1 described earlier. Therefore, the bi-level control circuit 22 further comprises a low-level adjustment P2, coupled to voltage comparator COMP3, for manually selecting a level of ambient light for activating the switch S1 so as to close the circuit to the light fixture, and a high-level adjustment P3, coupled to voltage comparator COMP2, for manually selecting a level of ambient light as detected by the sensor for activating the switch S1 to open the circuit to the lighting fixture. The interconnected NOR gates, NOR1 and NOR2, act as a flip-flop circuit. When the signal from the voltage comparator COMP3 indicates that the light level is below that selected by the low-level adjustment P2, amplifier Q1 is not activated, therefore switch S1 is not activated and the circuit to the light fixture remains closed. When the signal from voltage comparator COMP2 indicates that the light level is greater than the level selected by the high-level adjustment P3, then the amplifier Q1 is activated which in turn activates the switch S1, thereby opening the circuits to the light fixture. In between the too-dark setting and the too-light setting, the output of the flip-flop circuit to the amplifier Q1 will remain at its last state. Thus, the lights are turned on when it is darker than the low-level and do not turn off until the high-level is reached. Once the high-level is reached the lights are turned off and they are not turned on again until the low-level is reached. The differential in light intensity between the low-level and the high-level must be greater than the change resulting from activation of the fixtures. Otherwise, such a system directly monitoring the light in the work space would blink on and off. Because this preferred embodiment of the present invention directly monitors light levels in the work area, it is useful whenever more than one outside light source affects the light level in the work area or when curtains, shades, blinds or other impediments may affect the amount of light that actually reaches the work area from the outside light source.

To aid in adjustment of the bi-level control circuit 22, the low-level adjustment P2 and the high-level adjustment P3 each include an enunciator, LED1 and LED2 respectively, to indicate to the person making the adjustment when the light level as detected by the sensor is greater than the level selected by the adjusting means.

Figure 3:
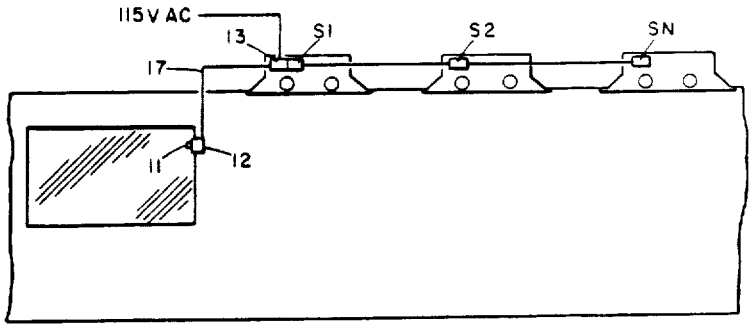
FIG. 3 is a drawing of the preferred embodiment of FIG. 1 in a typical installed configuration.

With reference now to FIG. 3, there is shown a typical installation of the light-sensing, light fixture control system depicted in FIG. 1. The light sensor 11 and the control circuit 12 are configured in a single module so located as to detect the strength of a source of ambient light entering the work area. Class 2 wiring 17 connects the control circuit 12 with the power supply 13 and with the switches S1, S2, . . . Sn.

Figure 4:
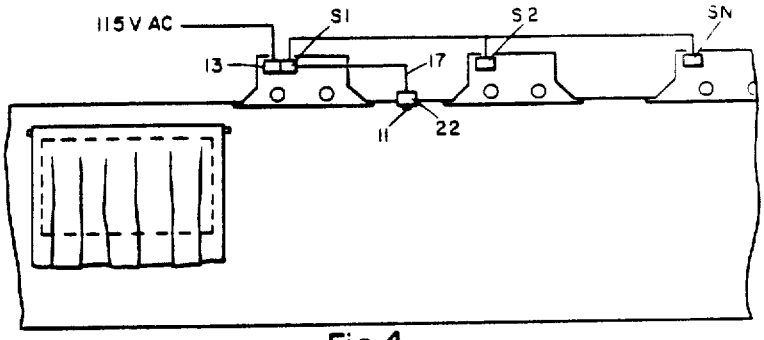
FIG. 4 is a drawing of the preferred embodiment of FIG. 2 in a typical installed configuration.

FIG. 4 shows a typical installation of the light-sensing, light fixture control system of FIG. 2 with the bi-level control circuit 22. The light sensor 11 is ceiling mounted to sense the ambient light level in the work area. The bi-level control circuit 22, located directly adjacent to the light sensor 11, is powered by the Class 2 wires 17 from the power source 13. Class 2 wires 17 connect the bi-level control circuit 22 with the light circuit power switches S1, S2, . . . Sn.

What is claimed is:

1. A light-sensing, light fixture control system that can be used in conjunction with a conventional high-voltage lighting system; having a conventional high-voltage power source system; said control system comprised of:

a light sensor mounted in optical communication with the ambient light near a light fixture;

a switch interposed in a circuit furnishing electrical power to the light fixture;

[a power source for supplying voltage of no greater than 20 volts at an amperage of no greater than 8 amperes to a control circuit; said power source located immediately adjacent a conventional power source for electrical attachment thereto; and]

a control circuit electrically connected to the sensor and to the switch for activating the switch in response to detection of predetermined light levels by the light sensor;

*a low-voltage power source for supplying low voltage and low power to said control circuit; said low-voltage power source being located immediately adjacent a conventional high-voltage power source for electrical attachment thereto; and* wherein the control circuit is further comprised of:

high-level adjusting means for manually selecting a level of ambient light as detected by the sensor for activating the switch so as to open the circuit to the light fixture;

low-level adjusting means for manually selecting a level of ambient light as detected by the sensor for activating the switch so as to close the circuit to the light fixture; said light sensor switch, control circuit, and power source for disposition to a conventional lighting system such that no additional high-voltage conduit is required.

2. A system according to claim 1 wherein:

the control circuit is electrically connected to a multiplicity of switches whereby several lighting circuits may be controlled.

3. A system according to claim 1 wherein:

the power source and the switch are located immediately adjacent to a light fixture.

4. A system according to claim 1 wherein:

the power source and the switch are located immediately adjacent to a light fixture junction box.

5. A system according to claim 1 wherein:

the control circuit further comprises a time-delay buffer for preventing transient changes in ambient light level as the detected by the sensor from effecting the output of the control circuit.

6. A system according to claim 1 wherein:

the light sensor is responsive to ambient light over a range of 5 to 600 foot-candles.

7. A system according to claim 1 wherein:

the switch closes the circuit to the light fixture in the absence of a signal from the control circuit.

8. A light-sensing, light fixture control system comprised of:

a light sensor mounted in optical communication with the ambient light near a light fixture;

a switch interposed in a circuit furnishing electrical power to the light fixture;

[a power source for supplying voltage of no greater than 20 volts at an amperage of no greater than 8 amperes to a control circuit; and]

a control circuit electrically connected to the sensor and to the switch for activating the switch in response to detection of predetermined light levels by the light sensor;

*a low-voltage power source for supplying low voltage and low power to said control circuit; and* wherein the control circuit is further comprised of:

high-level adjusting means for manually selecting a level of ambient light as detected by the sensor for activating the switch so as to open the circuit to the light fixture; the high-level adjusting means comprising:

an enunciator to indicate that the light level detected by the light sensor exceeds the level selected by the high-level adjusting means;

low-level adjusting means for manually selecting a level of ambient light as detected by the sensor for activating the switch so as to close the circuit to the light fixture; wherein the low-level adjusting means if further comprised of:

an enunciator to indicate when the ambient light level as detected by the sensor is greater than the level selected by the low-level adjusting means; and a time-delay buffer for preventing transient changes in ambient light level as [the] detected by the sensor from [effecting] *affecting* the output of the control circuit.

9. A system according to claim 8 wherein:

the light sensor is responsive to ambient light over a range of 5 to 600 foot-candles.

10. A system according to claim 9 wherein:

the switch closes the circuit to the light fixture in the absence of a signal from the control circuit.

* * * * *